(12) United States Patent
Kume et al.

(10) Patent No.: US 7,847,447 B2
(45) Date of Patent: Dec. 7, 2010

(54) ROTARY ACTUATOR HAVING ELECTRIC MOTOR AND SPEED REDUCTION DEVICE

(75) Inventors: Mikine Kume, Chiryu (JP); Seiji Nakayama, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/335,768

(22) Filed: Dec. 16, 2008

(65) Prior Publication Data
US 2009/0189468 A1 Jul. 30, 2009

(30) Foreign Application Priority Data
Jan. 25, 2008 (JP) .............................. 2008-015313

(51) Int. Cl.
H02K 7/16 (2006.01)
H02K 7/18 (2006.01)

(52) U.S. Cl. .............................. 310/83; 310/84; 310/99; 310/90; 310/100; 475/162

(58) Field of Classification Search ................... 310/90, 310/83, 99, 84, 100; 475/162; H02K 7/16, H02K 7/18
See application file for complete search history.

(56) References Cited

U.S. PATENT DOCUMENTS

| | | | | |
|---|---|---|---|---|
| 3,913,408 A * | 10/1975 | Moore | ............................. | 74/63 |
| 4,626,722 A * | 12/1986 | Fukui | ............................. | 310/82 |
| 5,145,329 A * | 9/1992 | Zumbusch et al. | ........... | 417/356 |
| 5,163,528 A * | 11/1992 | Kawamoto et al. | ....... | 180/65.51 |
| 5,382,854 A * | 1/1995 | Kawamoto et al. | ......... | 310/67 R |
| 5,415,377 A * | 5/1995 | Britt et al. | .................... | 254/323 |
| 6,425,838 B1 * | 7/2002 | Matsubara et al. | ............. | 475/5 |
| 6,701,803 B1 | 3/2004 | Tamai et al. | | |
| 7,038,338 B2 * | 5/2006 | Sesselmann et al. | .......... | 310/83 |
| 7,326,143 B2 | 2/2008 | Kimura et al. | | |

(Continued)

FOREIGN PATENT DOCUMENTS

JP 09-047003 2/1997

(Continued)

OTHER PUBLICATIONS

Japanese Office Action dated Nov. 26, 2009, issued in corresponding Japanese Application No. 2008-015313, with English translation.

*Primary Examiner*—Quyen Leung
*Assistant Examiner*—Terrance Kenerly
(74) *Attorney, Agent, or Firm*—Nixon & Vanderhye PC

(57) ABSTRACT

An electric motor and a speed reduction device for reducing a rotational speed of the motor are contained in a housing composed of a front housing and a rear housing. The motor is positioned in the housing at its rear side, and the speed reduction device at its front side. The speed reduction device is composed of a sun gear rotatably supported on an eccentric portion formed on a rotor shaft, a ring gear having inner teeth engaging with outer teeth of the sun gear, and an output shaft loosely coupled to the sun gear for outputting the rotational torque at a reduced speed. The ring gear made of a magnetic material is positioned in contact with an axial end of a stator core of the motor to provide an additional magnetic flux path and thereby to increase an output torque of the motor.

6 Claims, 6 Drawing Sheets

U.S. PATENT DOCUMENTS

| | | | |
|---|---|---|---|
| 7,501,730 B2 * | 3/2009 | Kimura et al. | 310/71 |
| 2005/0184606 A1 * | 8/2005 | Kokubu et al. | 310/75 R |
| 2005/0215375 A1 * | 9/2005 | Kimura et al. | 475/149 |
| 2007/0145839 A1 * | 6/2007 | Kimura et al. | 310/68 B |
| 2010/0179013 A1 * | 7/2010 | Nakamura | 475/179 |
| 2010/0194163 A1 * | 8/2010 | Cha et al. | 297/362 |

FOREIGN PATENT DOCUMENTS

| | | |
|---|---|---|
| JP | 11-332176 | 11/1999 |
| JP | 3665564 | 4/2005 |

* cited by examiner

US 7,847,447 B2

ROTARY ACTUATOR HAVING ELECTRIC MOTOR AND SPEED REDUCTION DEVICE

CROSS-REFERENCE TO RELATED APPLICATION

This application is based upon and claims benefit of priority of Japanese Patent Application No. 2008-15313 filed on Jan. 25, 2008, the content of which is incorporated herein by reference.

BACKGROUND OF THE INVENTION

1. Field of the Invention

The present invention relates to a rotary actuator composed of an electric motor and a speed reduction device.

2. Description of Related Art

An example of a rotary actuator composed of an electric motor and a speed reduction device, both disposed in contact with each other in its axial direction, is disclosed in JP-A-2005-282601. In order to improve an output torque of this kind of rotary actuator without enlarging its size, it is conceived to reduce a thickness of a stator core in a radial direction while increasing the number of winding in stator coils and/or to use materials having a higher grade in a rotor and a stator in the electric motor.

However, it is difficult to increase the output torque by reducing the radial thickness of the stator and increasing the number of winding in the stator coils because a magnetic flux in the stator core becomes saturated. A manufacturing cost of the rotary actuator becomes high if materials having a higher grade are used.

SUMMARY OF THE INVENTION

The present invention has been made in view of the above-mentioned problem, and an object of the present invention is to provide an improved rotary actuator that is able to output a higher torque without increasing its size and manufacturing cost.

The rotary actuator according to the present invention is used, For example, as an actuator for changing shift positions in a shift-by-wire system for an automatic transmission mounted on an automotive vehicle. The rotary actuator includes an electric motor such as a switched reluctance motor and a speed reduction device both contained in a housing composed of a front housing and a rear housing. The electric motor is disposed in the housing at its rear side and the speed reduction device at its front side, both connected in the axial direction.

An eccentric portion is integrally formed with a rotor shaft that is rotatably supported in the housing at its both axial ends. The speed reduction device is composed of a sun gear rotatably supported on the eccentric portion, a ring gear having inner teeth engaging with outer teeth of the sun gear and an output shaft loosely coupled to the sun gear. A rotational speed of the electric motor is reduced by the speed reduction device, and a rotational torque having a reduced speed is taken out from the output shaft.

The ring gear is made of a magnetic material and has a cylindrical portion extending in the axial direction. The cylindrical portion abuts an axial end of a stator core of the motor. A magnetic flux path in the stator core is enlarged by the cylindrical portion of the ring gear abutting the axial end of the stator core. Magnetic reluctance in the magnetic flux path is reduced because of the additional magnetic path formed in the ring gear, and thereby a higher rotational torque is generated in the electric motor without increasing a size of the motor and/or without using a magnetic material having a higher grade for the stator core and the rotor core.

Other objects and features of the present invention will become more readily apparent from a better understanding of the preferred embodiment described below with reference to the following drawings.

DETAILED DESCRIPTION OF THE PREFERRED EMBODIMENT

Figure 1:
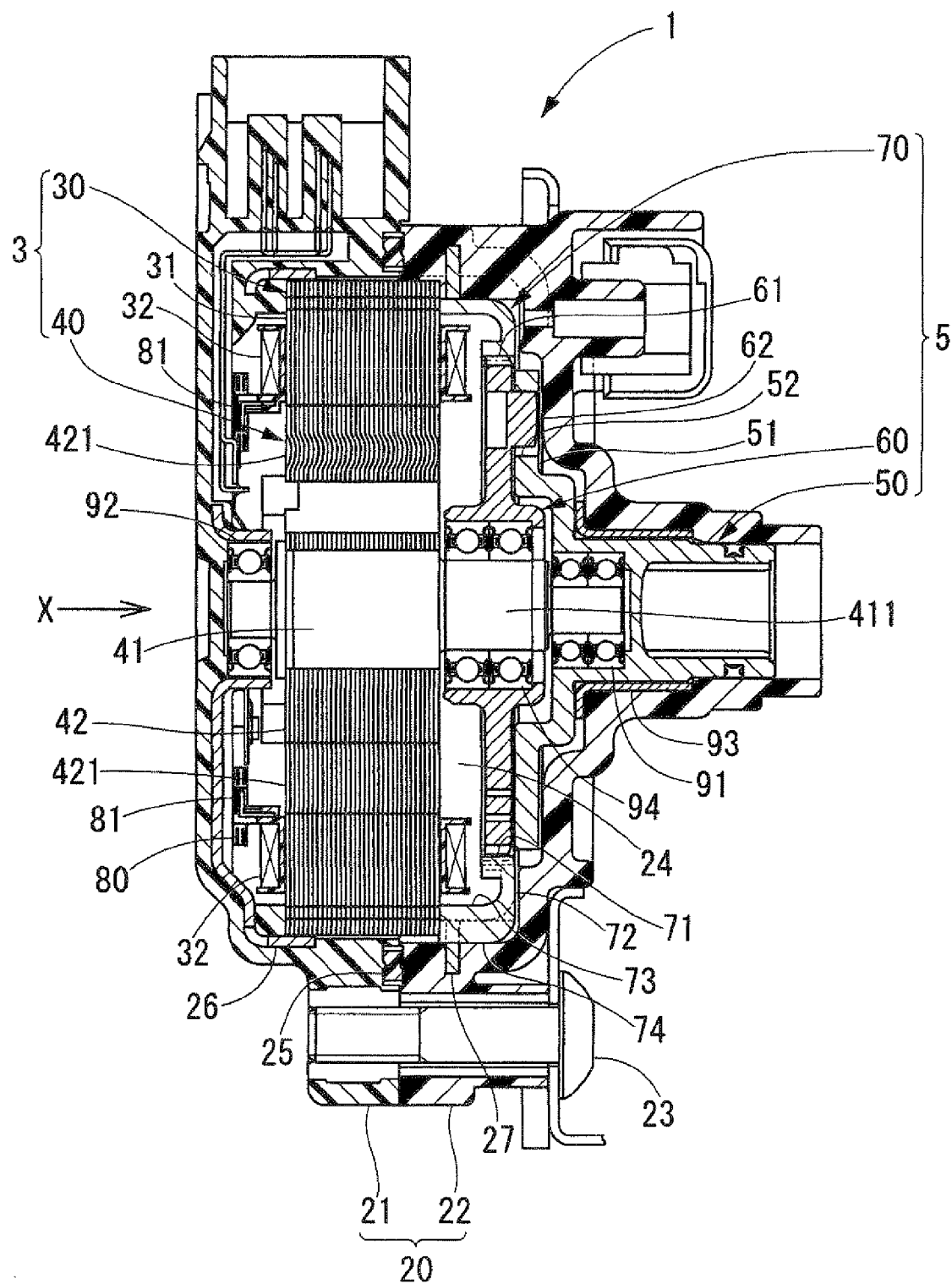
FIG. 1 is a cross-sectional view showing a rotary actuator according to the present invention.

A preferred embodiment of the present invention will be described with reference to accompanying drawings. A rotary actuator shown in FIG. 1 is used as an actuator in a shift-by-wire system for electronically shifting ranges in a transmission device in an automotive vehicle, for example.

Figure 2:
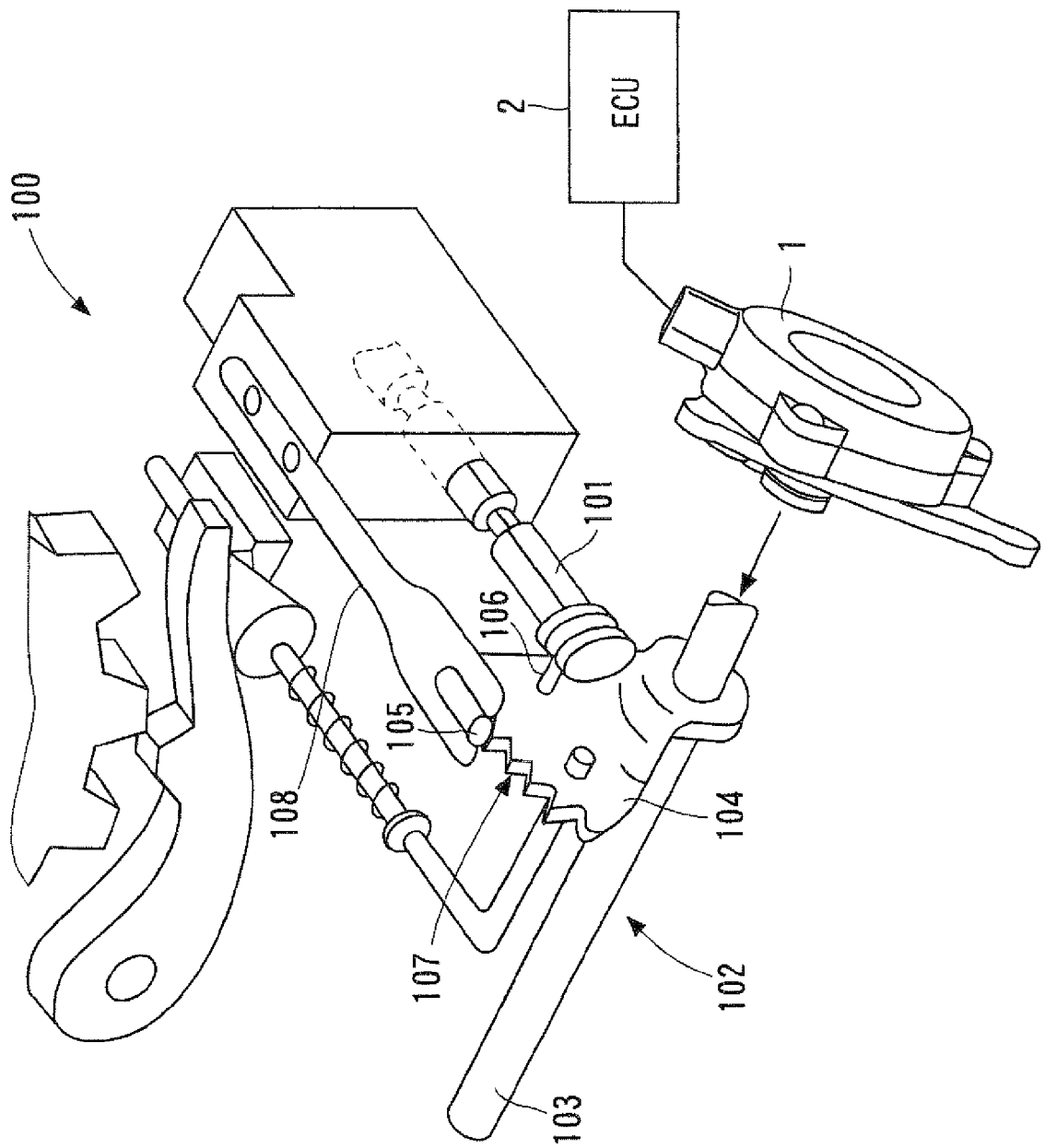
FIG. 2 is a perspective view showing a shift-by-wire system for electronically shifting gears in an automatic transmission, in which the rotary actuator shown in FIG. 1 is used.

With reference to FIG. 2, the shift-by-wire system 100 will be briefly explained. The rotary actuator 1 is driven according to signals fed from an electronic control unit (ECU) 2, and the shift positions in the transmission are changed by the rotary actuator 1. A rotational torque of the rotary actuator 1 is transmitted to a driving power transmitting device 102 which in turn transmits a driving power to a manual valve 101.

The driving power transmitting device 102 includes a driving rod 103 driven by the rotary actuator 1, a detent plate 104 connected to the driving rod 103 and a stopper 105. The detent plate 104 has a pin 106 extending in a direction parallel to the driving rod 103. The pin 106 is coupled with a groove formed in a manual valve 101. When the detent plate 104 is driven by the rotary actuator 1, the manual valve 101 is reciprocated back and forth. In other words, the rotating action of the rotary actuator 1 is converted into a linear movement of the manual valve 101.

The detent plate 104 includes depressions 107 formed on its radial outside. The depressions 107 engage with the stopper 105 supported by a leaf spring 108. The depressions 107 correspond to shift ranges of an automatic transmission. The shift ranges consist of a P-range, an R-range, an N-range and a D-range. Positions of the manual valve 101 in the axial direction are determined by the depression 107 engaging with the stopper 105. Upon rotation of the rotary actuator 1, the position of the depression 107 engaging with the stopper is changed, and thereby the shift ranges of the automatic transmission are changed.

Now, the rotary actuator 1 will be described. As shown in FIG. 1, the rotary actuator 1 is composed of a housing 20, an electric motor 3 (a switched reluctance motor is used in the embodiment, which is referred to as an SR motor) and a speed reduction device 5. The housing 20 is composed of a rear housing 21 and a front housing 22, both made of a resin material. The rear housing 21 and the front housing 22 are connected to each other by bolts 23, forming an inner space 24 therein. A resilient member 25 in a circular form is disposed between the rear housing 21 and the front housing 22 for sealing the inner space 24.

The SR motor 3 is a brushless motor that generates a rotational torque without using a permanent magnet. The SR motor 3 includes a stator 30 and a rotor 40. The stator 30 formed in a cylindrical shape is fixedly connected to the rear housing 21 by forcibly inserting it into a metallic plate 26 insert-molded in the rear housing 21.

Figure 5A:
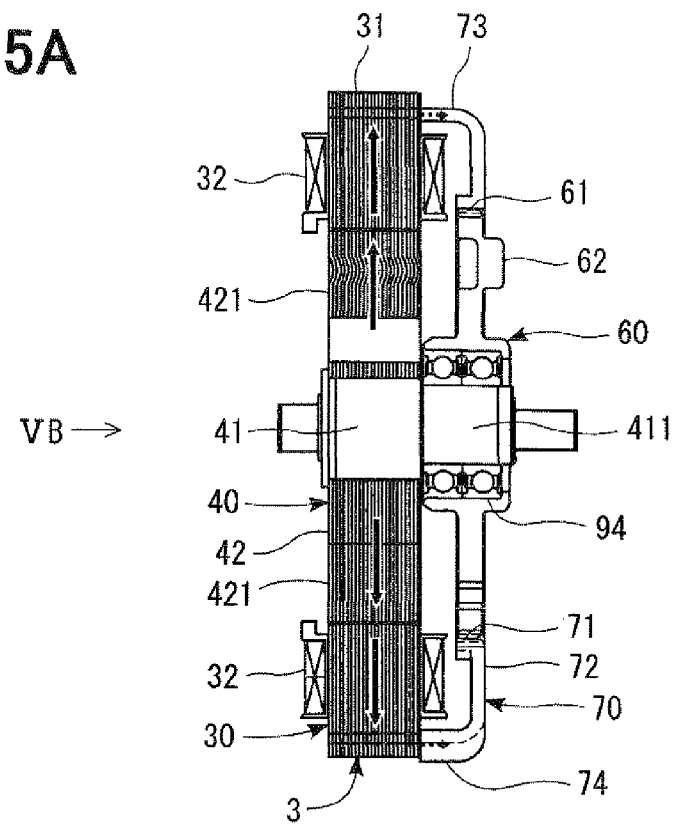
FIG. 5A is a cross-sectional view showing an electric motor and a part of a speed reduction device used in the rotary actuator shown in FIG. 1.
Figure 5B:
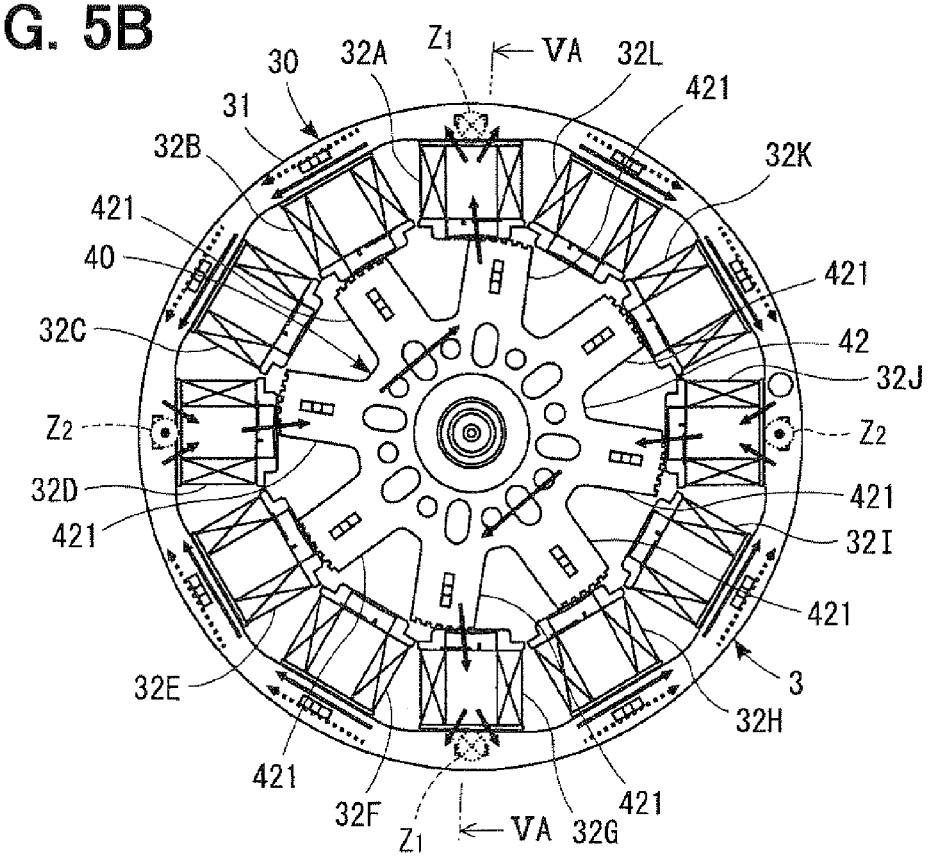
FIG. 5B is a plan view showing the electric motor, viewed in direction VB shown in FIG. 5A (or viewed in direction X shown in FIG. 1 with a rear housing removed)
Figure 6:
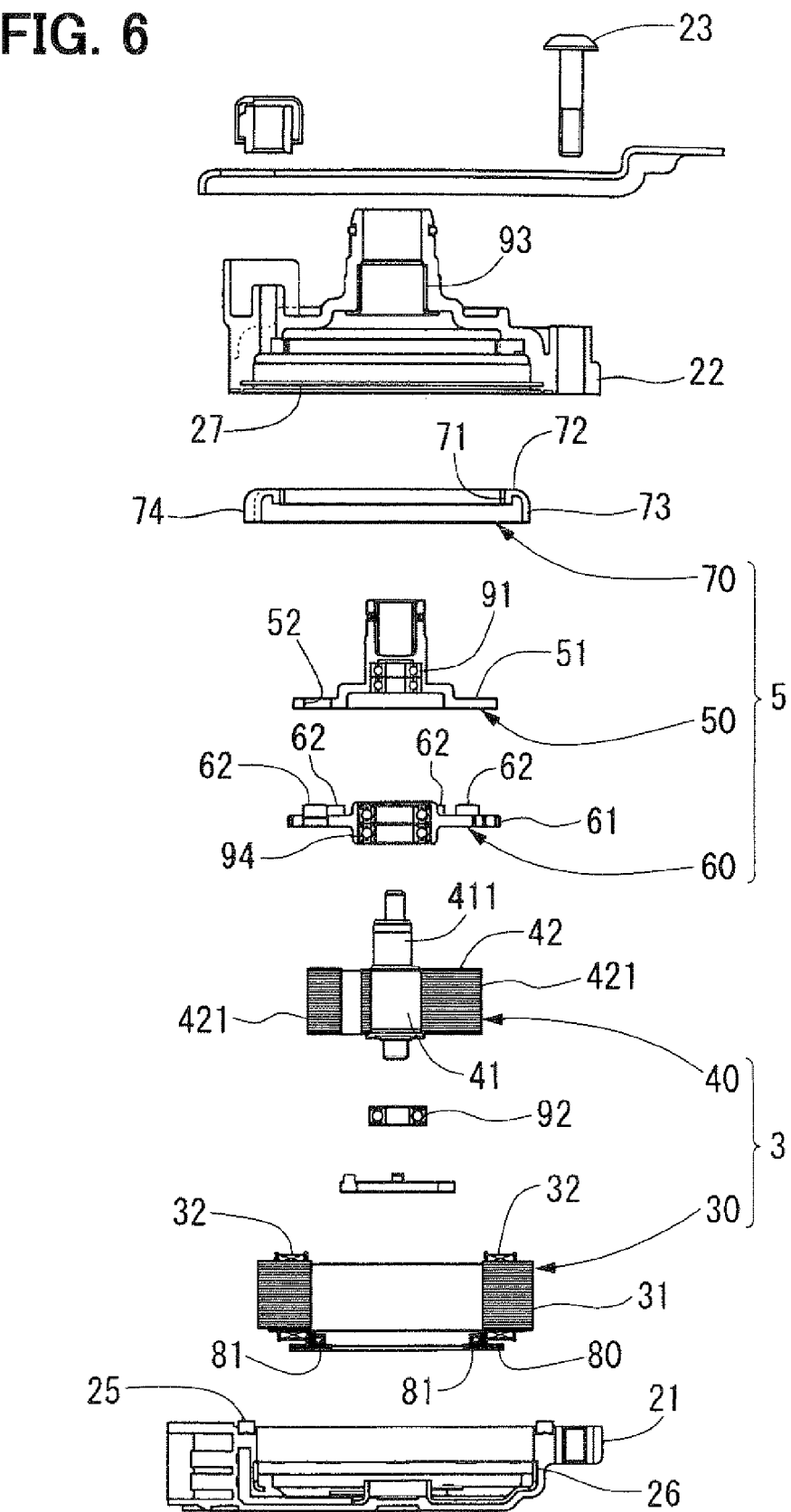
FIG. 6 is an exploded view showing components forming the rotary actuator shown in FIG. 1.

FIG. 5B shows the stator 30 and the rotor 40, viewed in X direction shown in FIG. 1, with the rear housing 21 removed. The stator 30 includes a stator core 31 and stator coils 32 (composed of stator coils 32A-32L). The stator core 31 having stator teeth formed at an interval of 30° is formed by laminating plural thin sheets. The stator coils 32A-32L are wound around the stator teeth projected inside. The stator coils 32A, 32D, 32G and 32J form a U-phase, the stator coils 32C, 32F, 32I and 32L form a V-phase, and the stator coils 32B, 32E, 32H and 32K form a W-phase. The stator coils 32 are electrically connected to a bus bar 80 disposed at the rear housing side through terminals 81 disposed at a radial inside portion of the stator coils 32 (refer to FIG. 1). Electric power is supplied to the stator coils 32 based on driving signals fed from the ECU 2.

The rotor 40 is disposed inside the stator 30 as shown in FIGS. 1, 5A, 5B and 6, The rotor 40 is composed of a rotor shaft 41 and a rotor core 42. The rotor shaft 41 is rotatably supported by a front bearing 91 held in an output shaft 50 of the speed reduction device 5 and a rear bearing 92 held in the rear housing 21. The output shaft 50 of the speed reduction device 5 is rotatably supported by a metal bearing 93 held in the front housing 22. The rotor core 42 is formed by laminating plural thin plates and is fixedly connected to the rotor shaft 41 by forcibly inserting the rotor shaft into a center hole of the rotor core 42.

As shown in FIG. 5B, the rotor core 42 has eight poles 421 projected toward the stator core 31. The projected poles 421 are formed at an interval of 45°. By switching electric power supplied to the stator coils 32 in an order of U-phase, V-phase and W-phase, the rotor 40 rotates in a counter-clockwise direction (in FIG. 5B). By switching in a reverse order, W-phase, V-phase and U-phase, the rotor 40 rotates in a clockwise direction. The rotor 40 rotates by 45° in every one cycle (U, V, W) of power supply. By switching the power supply to the stator coil 32, the rotor 40 is rotated in desired directions.

The speed reduction device 5 is composed of a sun gear 60, a ring gear 70 and an output shaft 50. The speed reduction device 5 is one type of a so-called planetary gear speed reduction device. The sun gear 60 is rotatably supported on an eccentric portion 411 of the rotor shaft 41 via a middle bearing 94. The eccentric portion 411 is integrally formed with the rotor shaft 41 to be eccentric with respect to the center axis of the rotor shaft 41. The sun gear 60 in a disc shape has outer teeth 61 formed at its outer periphery. The ring gear 70 is formed in a cup-shape and has inner teeth 71 engaging with the outer teeth 61 of the sun gear 60. The ring gear 70 is fixedly connected to the front housing 22. The number of the inner teeth 71 is made larger than that of the outer teeth 61. The sun gear 60 rotates eccentrically with respect to the center axis of the rotor shaft 41 while its outer teeth 61 are being engaged with the inner teeth 71 of the ring gear 70.

The output shaft 50 rotatably supported by the metal bearing 93 held in the front housing 22 has a flange 51 in a disc shape, as shown in FIG. 1. Holes 52 are formed through the flange 51 on a same circumferential circle. Pins 62 loosely coupled to the holes 52 are formed on the sun gear 60. Rotation of the sun gear, a speed of which is reduced from that of the rotor shaft 41 by rotating eccentrically with the rotor shaft 41, is outputted from the output shaft 50. The rotational torque of the output shaft 50 is transmitted to the driving power transmitting device 102 of the shift-by-wire system shown in FIG. 2.

Figure 3A:
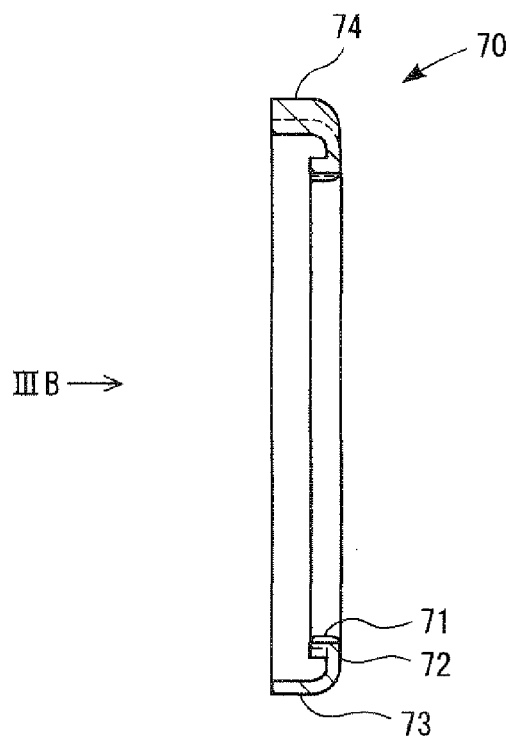
FIG. 3A is a cross-sectional view showing a ring gear used in the rotary actuator shown in FIG. 1.
Figure 3B:
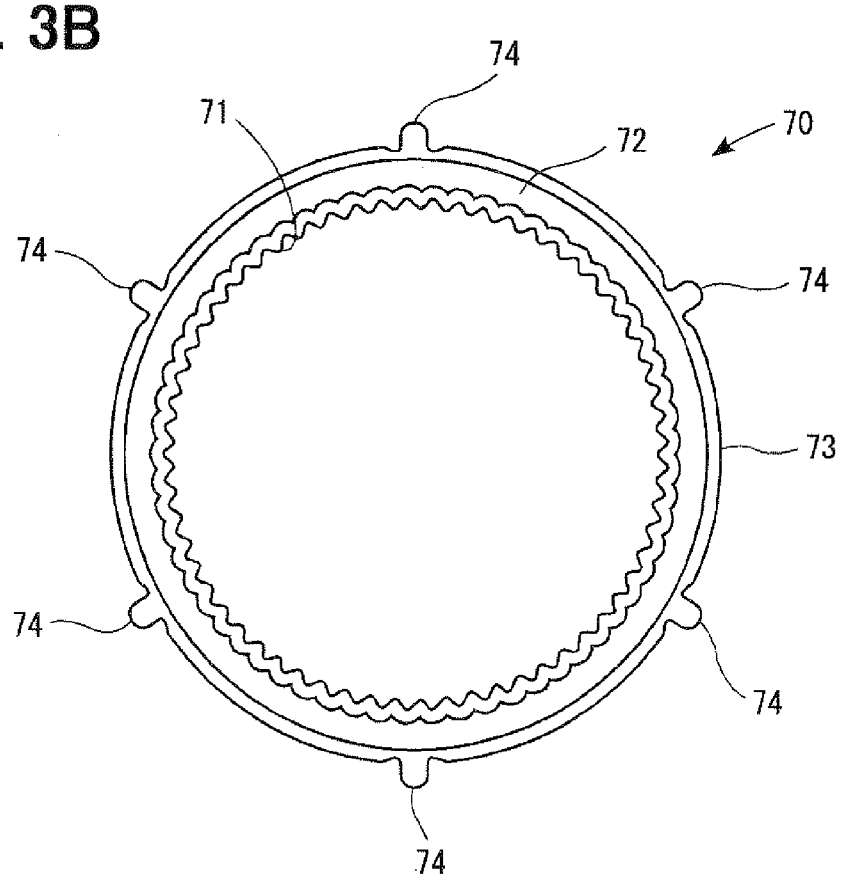
FIG. 3B is a plan view showing the ring gear, viewed in direction IIIB shown in FIG. 3A.
Figure 4A:
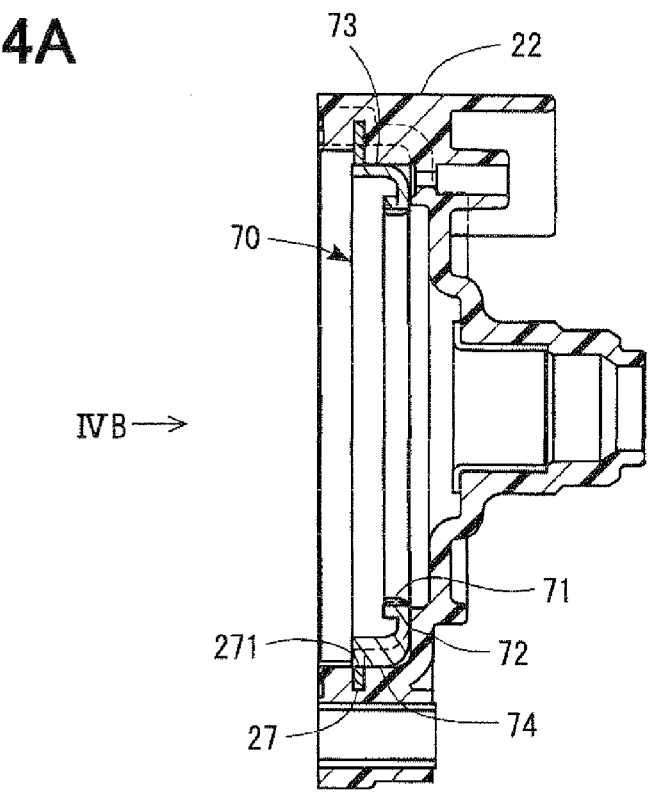
FIG. 4A is a cross-sectional view showing a front housing and a ring gear used in the rotary actuator shown in FIG. 1.
Figure 4B:
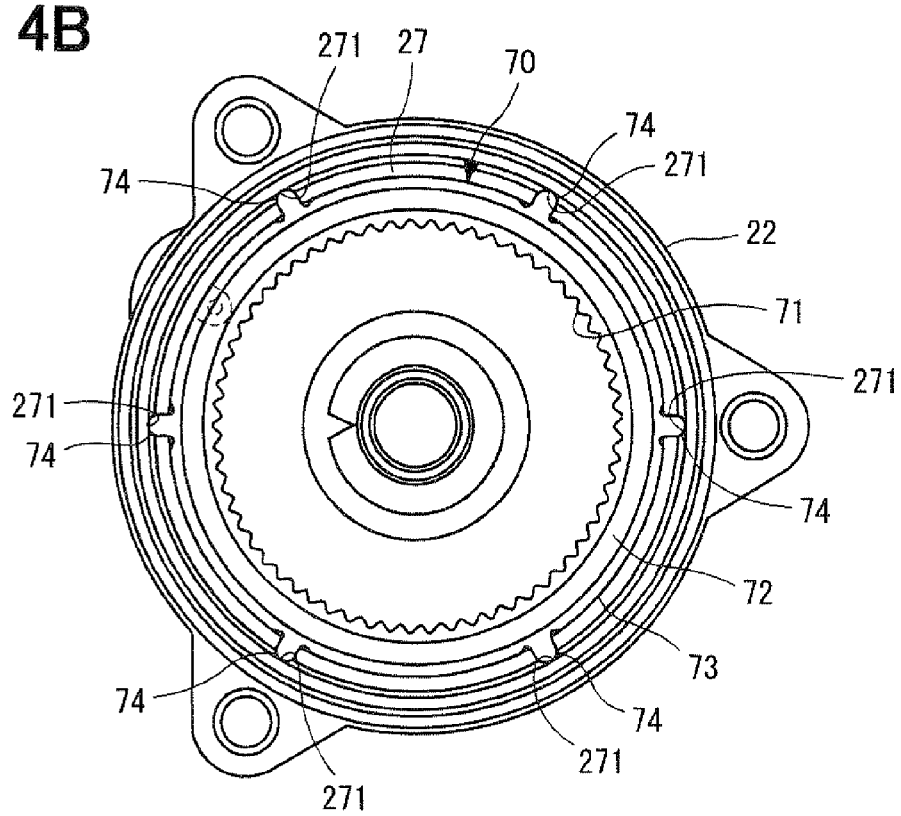
FIG. 4B is a plan view showing the front housing and the ring gear, viewed in direction IVB shown in FIG. 4.

Referring to FIGS. 3A and 3B, the ring rear 70 will be described in some more details. The ring gear 70 is composed of a gear body 72, on which the inner teeth 71 are formed, and a cylindrical portion 73 extending in the axial direction from the gear body 72. The cylindrical portion 73 has plural ear portions 74 extending outside in the radial direction. As shown in FIGS. 4A and 4B, a disc-shaped metal plate 27 is embedded in the front housing 22 by insert-molding. The metal plate 27 includes plural depressed portions 271 to which the ear portions 74 of the ring gear 70 are coupled. The ring gear 70 is fixedly connected to the front housing 22 by forcibly inserting the ear portions 74 into the depressed portions 271.

As shown in FIG. 1, the SR motor 3 is housed in the inner space 24 formed in the housing 20 at its rear side, and the speed reduction device 5 is housed at its front side. The cylindrical portion 73 of the ring gear 70 abuts an axial end of the stator core 31. Portions of the stator coils 32 extending from the axial end of the stator core 31 are positioned inside the cylindrical port on 73.

Referring to FIGS. 5A and 5B, magnetic flux flows in the stator core 31, the rotor core 42 and the ring gear 70 will be explained. The magnetic flux generated by the stator coils 32 flowing in the stator core 31 and the rotor core 42 is shown with solid lines, and that flowing in the ring gear 70 is shown with dotted lines. A direction of the magnetic flux flowing from the stator core 31 to the ring gear 70 is shown by "Z1" in FIG. 5B, and that from the ring gear 70 to the stator core 31 is shown by Z2.

The magnetic flux generated in the stator coil 32A flows through an outside portion of an outer wall of the stator core 31 toward the stator coils 32D and 32J. At the same time, the magnetic flux generated in the stator coil 32A flows through the cylindrical portion 73 of the ring gear 70 toward the stator coils 32D and 32J. Similarly, the magnetic flux generated in the stator coil 32G flows through an outside portion of an outer wall of the stator core 31 toward the stator coils 32D and 32J. At the same time, the magnetic flux generated in the stator coil 32G flows through the cylindrical portion 73 of the ring gear 70 toward the stator coils 32D and 32J.

The magnetic flux flowing from the stator coils 32A and 32G toward the stator coil 32D through both of the stator core 31 and the cylindrical portion 73 of the ring gear 70 flows to the stator teeth of coil 32A through the stator teeth of coil 32D and rotor core 42. Similarly, the magnetic flux flowing from the stator coils 32A and 32G toward the stator coil 32J through both of the stator core 31 and the cylindrical portion 73 of the ring gear 70 flows to the stator teeth of coil 32G through the stator teeth of coil 32J and rotor core 42.

Advantages attained in the embodiment of the present invention will be summarized below. Since the cylindrical portion 73 of the ring gear 70 contacts the axial end of the stator core 31, the magnetic flux paths are formed not only in the stator core 31 and the rotor core 42 but also in the cylindrical portion 73 of the ring gear 70, as described above. Therefore, magnetic reluctance in the SR motor is reduced and an amount of the magnetic flux is increased. Accordingly, the SR motor 3 generates a higher output without increasing its size and without using a stator and rotor core material having a high grade. As a result, the rotary actuator outputting a higher power can be made without increasing the manufacturing cost.

Both of the rear housing 21 and the front housing 22 are made of a resin material in this embodiment. It is desirable to make at least the front housing 22 with the resin material. The front housing 22 can be easily manufactured if it is made of the resin material, and the rotary actuator 1 can be made at a low cost. The ring gear 70 is firmly connected to the front housing 22 by inserting the ear portions 74 of the ring gear 70 into the depressed portions 271 of the metal plate 27 embedded in the front housing 22. In addition, since the cylindrical portion 73 of the ring gear abuts the axial end of the stator core 31, the ring gear 70 is further firmly held in the front housing 22.

The present invention is not limited to the embodiment described above, but it may be variously modified. For example, the ring gear 70 may be composed of a cylindrical portion and a gear body, both separately made and connected to each other. The sun gear 60 is coupled to the flange 51 of the output shaft 50 by coupling the pins 62 formed on the sun gear 60 to the holes 52 formed in the flange 51 in the foregoing embodiment. However, positions of the pins 62 and the holes 52 may be reversed, i.e., the pins may be made on the flange 51 and the holes may be made in the sun gear 60. The number of the stator teeth and the number of the rotor poles are not limited to those of the foregoing embodiment. They may be arbitrarily set. A thickness of stator outer wall may be further reduced by increasing a magnetic path through the cylindrical portion of the ring gear. Though the SR motor is used as the electric motor in the rotary actuator, the SR motor may be replaced by other motors. The rotary actuator according to the present invention may be applied to various devices other than the shift-by-wire system.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A rotary actuator comprising:
an electric motor composed of a rotor having a rotor shaft and a rotor core connected to the rotor shaft and a cylindrical stator including a stator core and stator coils, the stator core having stator teeth formed at a radially inner side thereof, the stator coils being wound around the stator teeth extending toward the rotor, the electric motor generating a rotational torque for rotating the rotor shaft;
an eccentric portion integrally formed with the rotor shaft, the eccentric portion being formed to be eccentric with respect to a rotational axis of the rotor; and
a speed reduction device having a sun gear rotatably supported on the eccentric portion, the sun gear having outer teeth formed on an outer periphery thereof, and a ring gear made of a magnetic material having inner teeth engaging with the outer teeth of the sun gear, the speed reduction device outputting a rotational torque transmitted from the rotor shaft by reducing a rotational speed, wherein:
the cylindrical stator of the electric motor abuts the ring gear in an axial direction of the rotor shaft, such that a portion of the stator core located on a radially outer side of the stator coils is in contact with the ring gear,
the front housing is made of a resin material,
the front housing includes a metal plate partly embedded in the front housing,
the ring gear is forcibly inserted into the metal plate, and
the ring gear includes a cylindrical portion directly abutting the cylindrical stator.

2. The rotary actuator as in claim 1, including a rear housing and a front housing abutting each other in the axial direction of the rotor shaft, forming an inner space therebetween, wherein:
the electric motor is contained in the inner space at a rear housing side and the speed reduction device is contained in the inner space at the front housing side.

3. The rotary actuator as in claim 2, wherein:
the ring gear includes a plurality of ear portions extending outside of an outer periphery of the ring gear; and
the metal plate has a plurality of depressed portions closely accommodating the ear portions therein, the metal plate being embedded in the front housing by insert-molding.

4. The rotary actuator as in claim 1, wherein the electric motor is a switched reluctance motor.

5. The rotary actuator as in claim 1, wherein the cylindrical portion extends in the axial direction of the rotor shaft, the cylindrical portion abutting an axial end of the cylindrical stator.

6. The rotary actuator as in claim 2, wherein:
the cylindrical stator has an axial end facing the ring gear in an axial direction of the rotor shaft, and
the surface of the stator core is in direct contact with the ring gear so as to form a magnetic flux path in the ring gear.

* * * * *